United States Patent [19]

Gevas

[11] Patent Number: 4,969,245

[45] Date of Patent: * Nov. 13, 1990

[54] WHEELED VEHICLE TIRE WHEEL MOUNTING AID

[76] Inventor: James C. Gevas, One Ford Ln., Roseland, N.J. 07068

[*] Notice: The portion of the term of this patent subsequent to Jul. 18, 2006 has been disclaimed.

[21] Appl. No.: 376,650

[22] Filed: Jul. 7, 1989

Related U.S. Application Data

[63] Continuation-in-part of Ser. No. 333,125, Apr. 4, 1989, which is a continuation-in-part of Ser. No. 164,326, Mar. 4, 1988, Pat. No. 4,847,971.

[51] Int. Cl.$^5$ .............................................. B25B 27/14
[52] U.S. Cl. .................................... 29/273; 301/9 DN
[58] Field of Search ......................... 29/273, 271, 802; 81/53.2, DIG. 11; 403/342; 301/9 DN, 36 R

[56] References Cited

U.S. PATENT DOCUMENTS

| | | | | |
|---|---|---|---|---|
| 1,494,269 | 5/1924 | Meyers | ................................. | 29/273 |
| 2,826,806 | 3/1958 | McDonald | ........................... | 29/271 |
| 4,702,527 | 10/1987 | Kawano | .......................... | 301/9 DN |
| 4,718,732 | 1/1988 | Osborne | .......................... | 301/9 DN |

*Primary Examiner*—P. W. Echols

[57] ABSTRACT

An apparatus to reduce the difficulty in tire wheel aligning/mounting in stud/lug nut applications. The apparatus is a detachable two-part mount stud extension assembly comprised of an extender and an adapter which is screwed onto a mount stud, thus extending the outward extension/reach of this mount stud beyond that of the unextended mount studs. The extender is a headed shaft. The adapter is a hollow cylinder whose one end has an internal thread which fits that of a mating mount stud, and whose other end has an extender alignment hole. The unheaded extender end is inserted into the threaded-end cavity of the adapter, on into the extender alignment hole. The adapter is screwed onto a mating mount stud, thus capturing the extender in one axial direction by the mount stud, and in the other axial direction by the adapter structure. An absence of extender axial end play signals safe and secure adapter/apparatus installation. Initially aligning and mounting the tire wheel onto the apparatus reduces the number of studs required to be initially aligned/cleared/mounted, thus reducing the align/mount difficulty. After the initial align/mount, the tire wheel is easily pushed onto its final mount position. The apparatus is then removed and the lug nuts installed.

6 Claims, 4 Drawing Sheets

WHEELED VEHICLE TIRE WHEEL MOUNTING AID

This application is a continuation-in-part of application Ser. No. 07/333,125 filed on Apr. 4, 1989, which is a continuation-in-part of application Ser. No. 07/164,326 filed on Mar. 4, 1988, now U.S. Pat. No. 4,847,971.

BACKGROUND OF THE INVENTION

1. Field of the Invention

This invention relates to the mounting and securing onto a wheeled vehicle of its tire wheel, where the mounting and securing means include a multiplicity of studs and lug nuts. In particular, the present invention addresses itself to:

a. Easing the manual difficulty and effort required to align and mount the tire wheel onto the vehicle.
  b. Overcoming difficulties and limitations in previous solutions to the subject problem including: some previous art does not significantly ease the tire wheel problem; none of the previous art which depends upon secure screwing onto the vehicle mount stud includes a positive means of assuring the user that said screwing is safely consummated: given the dirt, metal and rust material practically encountered in the threads, this represents a safety hazard for general public usage.

2. Description of the Prior Art

Inherent in the process of mounting a tire wheel onto a wheeled vehicle is the manual difficulty and effort which is required as a consequence of the required weight suspension and three-dimensional translational and angular alignment of the tire wheel with respect to its mount geometry. This process requires manual strength, effort, spatial/geometric perception and projection, and dexterity on the part of the person mounting the tire wheel. Further, this mounting process is made significantly more difficult if the ambient light conditions are poor. Also, a solution must be small, easily stored.

Alleviation of this difficulty and required effort has long been sought, and means for addressing this objective have long existed in the prior art.

One class of the prior art is exemplified by the Hendry U.S. Pat. No. 1,964,119 which fights the weight and bulkiness of the tire wheel with a tire wheel handling apparatus with tire wheel lift, suspend and rotate capability. However, this apparatus carries the disadvantages of an awkward mounting process per se, plus the need to have physical recourse and access to an apparatus which is quite large, bulky and heavy, and whose expense further renders it impractical for widespread use.

Another class of the prior art means is exemplified by the Kayfetz U.S. Pat. No. 2,499,758 which discloses a normally horizontal shaft, one end of which is screwed into one of the tire wheel mounting studs and the other has an inclinable extension which can be used as an inclinable lift-guide lever to guide the tire wheel onto its mounting alignment after said inclinable extension is passed through one of the stud clearance holes on the tire wheel proper. This wheel mounter suffers from an insufficient relief of the difficulty in tire wheel mounting, this in part because the operator-user has one hand on the inclinable lift-guide lever and the other supports and guides the tire wheel. The apparatus disclosed also has the limitations of being a complex multi-part apparatus, and, is usable with only a single mounting stud thread size and type.

Another prior art means is exemplified by the Jamieson U.S. Pat. No. 2,708,712 which is an illuminated wheel mounting guide. One version of said disclosed guide consists of a cylindrical body, one internally-threaded end of which is screwed onto a tire wheel mounting stud, and the other end has illuminating means which together with additional wall openings along said cylinder afford assistance to the mounting process via illumination both of the tire wheel-mounting surface area, and of a target zone over which the mount stud clearance holes on the wheel are passed. This embodiment suffers from a complex multi-part construction, limited reliability of the illuminating means over time and in the physical environment normally experienced, and the fact that the guide disclosed is usable only with a single mount stud thread size and type. A second version of said disclosed guide basically consists of a lever which can be used to jockey the tire wheel onto its mounting alignment, where said lever has illuminating means at both of its ends. Said illuminating means illuminate both the tire wheel clearance holes and the vehicle tire wheel mounting stud and surface area. Said second version suffers from an insufficient relief of the tire wheel mounting effort and difficulty, has limited reliability, is a complex multi-part apparatus, and does not have a secure means of resting/connecting/attaching said jockey/align/illuminating lever onto its mating tire wheel mount stud.

Another prior art means is exemplified by the Interdonato U.S. Pat. No. 4,097,979, a guide tool for mounting vehicle tire wheels. This essentially consists of a cylindrical element with internal threads at each end. Said internal threads can be screwed onto tire wheel mounting studs on the vehicle, said cylindrical element thus serving as a tire wheel mounting guide. Two mounting stud thread sizes and types can be accommodated by this guide tool, since each of its two internal threads can be different. However, said disclosed tool suffers from the limitation that the difference in the physically permissible thread sizes at each of the tool ends fails the test of practical adequacy, in that the size differential permissible is too small. This follows from the fact that the threads at both ends of the tool share a common maximum guide tool outer diameter: the effect of the practical geometries of said thread sizes and the corresponding tire wheel clearance holes, and the constraint of a shared maximum tool diameter, is to prohibitively limit the range of different thread sizes which can be used on a given tool guide.

None of the previous art which requires secure screwing onto a mating vehicle mount stud has a positive safe means of assuring that said screwing has been safely consummated. Given the dirt, metal and rust material practically encountered, this represents a safety hazard for general public usage of said prior art.

SUMMARY OF THE INVENTION

An object of the present invention is to reduce the manual effort and difficulty inherent in the process of aligning and mounting a tire wheel onto a wheeled vehicle where said tire wheel is mounted and secured by means of a multiplicity of threaded mount studs and lug nuts. Given the dirt, rust and metal material encountered, another object of the present invention is to provide a positive safe means of assuring that it has been safely screwed onto the vehicle tire wheel mount stud, thus overcoming the safety hazard created by the absence of this positive safe means in the prior art. Another object of the present invention is to achieve means which are reliable. Another object of the present invention is to reduce the manual effort and difficulty and increase the safety in aligning and mounting a tire wheel onto a vehicle under poor lighting conditions. A further object of the present invention is that it enable low-cost, high-volume manufacturing. In accordance with the present invention, these objectives are achieved by the introduction of new elements and functions in vehicle tire wheel alignment and mounting.

The present invention consists of a detachable two-part extension to the vehicle tire wheel mount studs. Said stud extension is screwed onto any of the vehicle tire wheel mount studs prior to the beginning of the tire wheel mount process. Said stud extension extends outwards from the vehicle further than do the unextended studs in the tire wheel mount stud array, and serves as the tire wheel initial-align/mount stud. In the first phase of the two-phase align-and-mount process, the tire wheel is aligned with and mounted onto said tire wheel mount stud extension: the required manual effort and difficulty is greatly reduced by the major relaxation and easing of the spatial alignment tolerance requirement which results from mounting the tire wheel onto one rather than simultaneously onto all of the studs in the mount stud array. At this point, said stud extension is supporting the weight of the tire wheel while simultaneously preserving its initial alignment. In the second phase of this process, the suspended and initially-aligned tire wheel is pushed and moved on and along said stud extension and then onto the entire stud array to its final mounting position. After the removal of said stud extension, the securing of the tire wheel is accomplished by screwing on the lug nuts. This second phase is also accomplished with a very low requirement of manual effort and difficulty, because said stud extension both supports the weight of the tire wheel and preserves its alignment as the align-and-mount process proceeds through to completion.

Said stud extension consists of a two-part assembly, comprised of one extender and one adapter. The extender is a headed shaft with an internal thread at its unheaded end. Said head is a disk-like end at one end of the shaft section of the extender. The diameter of said head is greater than the outer diameter of said shaft section of the extender. The adapter is basically cylindrical. The adapter may have different outer diameters at its two axial ends. One end section of said adapter is internally threaded; this thread fits that of the mating vehicle tire wheel mount stud. The opening at the other, second end section of said adapter is an extender alignment hole which envelops, supports and guides said extender. Said stud extension is assembled by slipping the unheaded end of said extender into the opening at the threaded end section of the adapter, on and along into said extender alignment hole; said adapter is then screwed onto any of the vehicle tire wheel mount studs, thus securing the two-part mount stud extension assembly onto its mating tire wheel mount stud on the vehicle. In this assembled state, the extender head is captured in one axial direction by the end face of the vehicle tire wheel mount stud, and in the other axial direction the extender head is captured by the adapter housing at the terminal, inner end of its extender alignment hole.

In order that the tire wheel align and mount process be safe, the screwing of said stud extension onto the vehicle tire wheel mount stud according to the present invention must proceed through to the point where an adequate number of mating threads are engaged. Prior to reaching this screwing point, resistance to further screwing caused by dirt, rust or metal shavings can mislead a lay user into thinking that secure screwing has been achieved. According to the present invention, a positive safe means of checking for the achievement of safe and secure screwing is afforded to the general lay public user by checking for longitudinal axis end play in said extender: said screwing is safely consummated when the point is reached where there is no longer any longitudinal, axial play of said extender along the longitudinal axial axis of said extender alignment hole of said adapter and its own longitudinal axis.

The adapter constitutes the effective extension of the vehicle tire wheel mount stud, extending approximately four and one-half inches outward beyond the outer end face of the vehicle tire wheel mount stud when said two-part mount stud extension assembly is securely screwed onto said vehicle tire wheel mount stud, at which point said extender does not protrude outward beyond the outer end face of said adapter, but lies within the longitudinal length of said adapter.

In order to check that said screwing of said stud extension onto the vehicle tire wheel mount stud has been safely consummated, a two-step process is carried out. First step: physical access to said extender is achieved via an extender longitudinal extension which is at that point screwed onto said extender. Said extender longitudinal extension is a shaft with an externally threaded end which fits and is screwed into said internal thread of said unheaded end of said extender, after which said extender longitudinal extension extends outward beyond the outer end face of said adapter approximately three-quarters of an inch. Second Step: said extender longitudinal extension is grasped at its protruding end and said extender is checked for the absence of longitudinal, axial play along its longitudinal axis. Following said Second Step said extender longitudinal extension is unscrewed from said extender and removed, and the tire wheel align-and-mount process is then performed.

The present invention achieves all of its objectives: it greatly reduces the manual effort and difficulty required to align and mount a tire wheel in conditions of good and poor lighting; it provides a positive safe means of assuring secure screwing onto said vehicle tire wheel mount stud; it is small, light, easily stored and available due to its small size and weight; it is reliable; it is very much suited for low-cost, high-volume manufacturing.

BRIEF DESCRIPTION OF THE DRAWINGS

A better understanding of the present invention will be gained by reading the detailed description which will follow. This detailed description references the appended drawings, of which a brief description is here given.

FIGS. 1, 2, 3, 4 and 5 show elements and situations in the prior art. FIGS. 6, 7, 8, 9, 10 and 11 show the present invention.

FIG. 1 is an elevational view of a conventional wheeled vehicle tire wheel which is mounted and secured onto the vehicle by means of a multiplicity of studs and lug nuts.

FIG. 2 is a tire wheel sectional view taken along line 2—2 of FIG. 1.

FIG. 4 is a fractionated view showing an example of translational misalignment between the tire wheel of FIG. 1 and the mount stud array of FIG. 3(a).

FIG. 5(a) is a construction view used in the description of FIG. 5(b).

FIG. 6 shows a successful engagement of the tire wheel of FIG. 1 with the mount stud array which has been extended by detachable stud extensions in accordance with the present invention in the first phase of the two-phase align-and-mount process. For clarity of presentation, in this drawing the extended mount stud is shown in its extended-length geometry without showing the details of the detachable stud extension according to the present invention. FIG. 6 is an exact situational view and geometric repeat of the relative spatial positioning between the tire wheel and the vehicle mount studs as shown in FIG. 5(b).

FIG. 8(a) is a perspective view of the extender in the same embodiment of the present invention as is FIG. 7(a) and (b). FIG. 8(b) is an elevational view of the extender of FIG. 8(a). FIG. 8(c) is an end view of the extender of FIG. 8(a).

FIG. 9 is a sectional view through the longitudinal axis of the detachable two-part mount stud extension assembly in the embodiment of the present invention comprised of the adapter 28 shown in FIG. 7 and the extender 35 shown in FIG. 8, in the situation just prior to the start of the first, align phase of the two-phase tire wheel align-and-mount process and following completion of the installation screwing of said assembly onto mount stud 16.

FIG. 10 is a sectional view through the longitudinal axis of the detachable two-part mount stud extension assembly in Example #2 of the present invention comprised of the adapter 28A and extender 35A following completion of the installation screwing of said assembly onto mount stud 16 just prior to the start of the first, align phase of the two-phase tire wheel align-and-mount process.

FIG. 11 is a sectional view through the longitudinal axis of the detachable two-part mount stud extension assembly in Example #3 of the present invention which is comprised of adapter 28A and extender 35B. Said embodiment is depicted in an illustrative/typical cooperative configuration with extender longitudinal-extension 35C.

FIG. 12A and 12B are the elevational and end views respectively of extender 35E of the detachable two-part mount stud extension assembly in Example #4 of the present invention.

FIG. 13 is a sectional view through the longitudinal axis of the detachable two-part mount stud extension assembly in Example #4 of the present invention.

DETAIL DESCRIPTION OF THE INVENTION

EXAMPLE #1

The present invention is best understood by first examining the precise alignment geometries and tire wheel handlings involved in the tire wheel mounting process for stud-lug nut mounting systems. This examination will as a concurrent by-product also reveal problems and limitations of the prior art which are ameliorated by the present invention.

Figure 1:
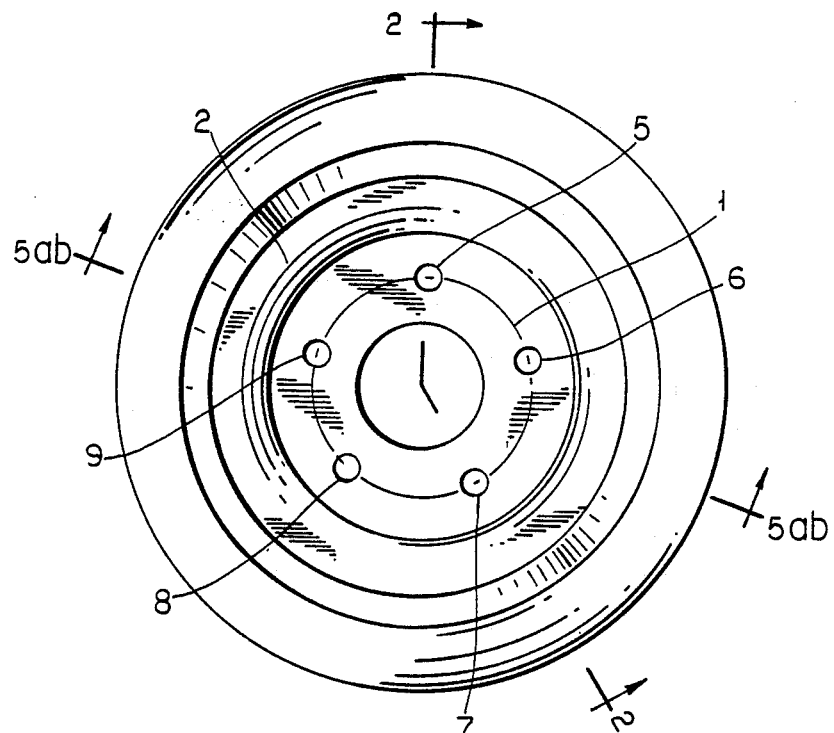
Figure 2:
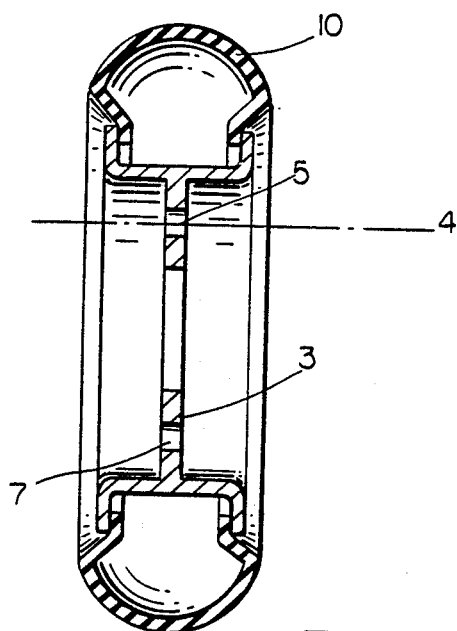

Tire wheel 2 shown in FIG. 1 has an array of clearance holes 5, 6, 7, 8 and 9 which are spaced equidistant along circular centerline 1. FIG. 2 shows tire wheel mounting surface 3 which bears against its mating vehicle mounting surface when the tire wheel is in its mounted position. The axial centerlines of the clearance holes are exemplified by 4, which is the axial centerline of clearance hole 5. Whether the tire 10 is tubeless as shown in FIG. 2 or whether it has a tube is of no significance or relevance to the present invention or its workings.

Figure 3A:
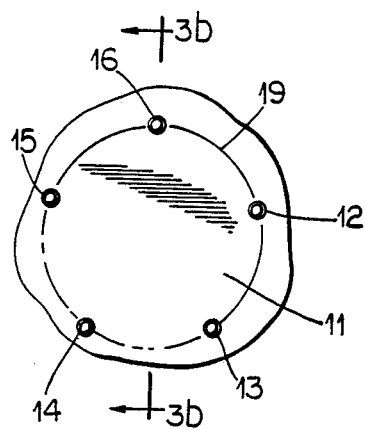
FIG. 3(a) is a front view of a representative mount stud array permanently affixed to the vehicle, on which mount studs the tire wheel is mounted and secured. Showing details of mounting alignment.

FIG. 3(a) shows the planar vehicle mounting surface 11, against which tire wheel mounting surface 3 bears when tire wheel 2 is in its mounted position. Threaded mount studs 12, 13, 14, 15 and 16 on which tire wheel 2 is mounted are spaced equidistant along circular centerline 19, are oriented such that their longitudinal axes are perpendicular to vehicle mounting surface 11, and pass through their respective clearance holes 5, 6, 7, 8 and 9 as mounting is achieved.

Given the geometry of any particular tire wheel and mounting system, plus the range of possible tire wheel handlings and guidance, there are an infinity of possible mounting path geometries which can be followed by tire wheel 2 in the align-and-mount process. It is therefore useful to consider what will be here called the final alignment. Final alignment is here defined as that tire wheel positioning which exists at the first point at which all of the clearance holes in the tire wheel have successfully enveloped and slipped over their respective mount studs by a finite distance.

Figure 3B:
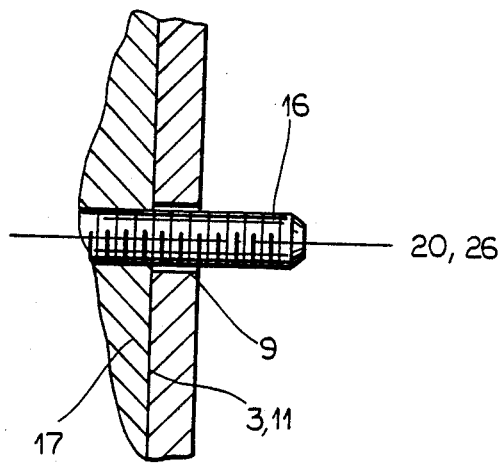
FIG. 3(b) is a fractionated sectional view along line 36—36 FIG. 3(a) when the tire wheel is completely aligned with the mount studs.

FIG. 3(b) shows an example of final mounting, tire wheel 2 bearing against vehicle mounting structure 17. Within the practical tolerances which prevail, axial centerline 26 of clearance hole 9 coincides with and is co-axial with the axial centerline 20 of mating mount stud 16, and, tire wheel mounting surface 3 bears against and is parallel to vehicle mounting surface 11.

Figure 4:
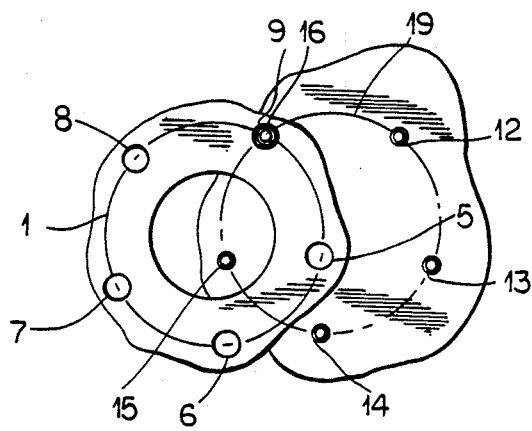

FIG. 4 shows an example where final alignment has not been achieved. Here, tire wheel mounting surface 3 is parallel to vehicle mounting surface 11, but with the exception of the paired clearance hole 9 and mount stud 16, the axial centerlines of the clearance holes are far from co-linear with those of the mount studs. If one were proceeding forward from the situation depicted in FIG. 4 generally, final alignment would not be achieved directly, but rather, would follow only after repeated, successive tire wheel alignment traverses and rotations. One of the reasons for this is that the tire wheel weight and bulkiness greatly increases the difficulty of tire wheel spatial maneuvering and of even maintaining the degree of spatial alignment already achieved at any point.

Figure 5A:
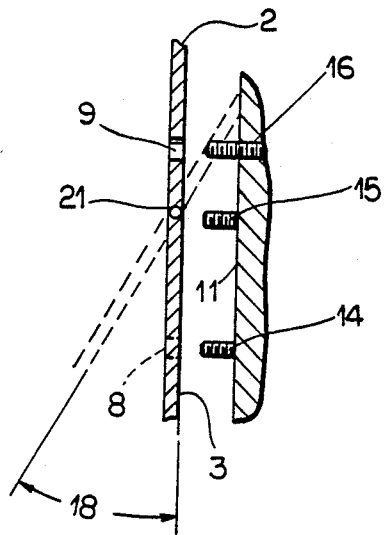
FIGS. 5(a) and (b) are both fractionated sectional views along line 5ab—5ab of the wheel of FIG. 1 and the mont stud array of FIG. 3(a) when they are proximate to each other in the align-and-mount process.
Figure 5B:
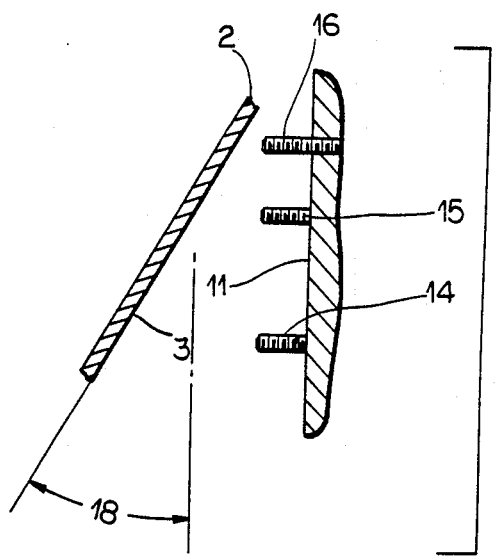
FIG. 5(b) shows an example of angular misalignment between the corresponding planes of the tire wheel and the mount stud array.

The example of tire wheel misalignment shown in FIG. 5(b) is best understood by referring now to a construction view shown in FIG. 5 (a). In FIG. 5(a), the solid line rendition of tire wheel 2 has its mounting surface 3 parallel to vehicle mounting surface 11. Further, though they do not all appear in this view, the axial centerlines of its clearance holes 5, 6, 7, 8 and 9 are approximately co-linear with the axial centerlines of their corresponding mount studs 12, 13, 14, 15 and 16. The point labeled 21 is the end view of line 21 which wholly lies in the tire wheel mounting surface 3. The circle around point 21 is a schematic designator used in the drawing as a graphic aid to pinpoint the location of point 21. Line 21 appears as a point because it is perpendicular to this view. The dotted line rendition of the wheel shows tire wheel mounting surface 3 rotationally displaced from its solid line position by the angle 18 about point 21. FIG. 5(b) was derived via a construction whose starting-point is the dotted-line position in FIG. 5(a), from which tires wheel 2 was translationally moved in a planar direction normal to and away from vehicle mounting surface 11.

What is shown in FIG. 5(b) therefore, is another class of tire wheel misalignment. Here again, the achievement of final alignment is hampered by the difficulty of maintaining visual contact with the mount studs, plus the difficulty of both suspending and guiding the tire wheel in space given its weight and bulkiness. The example of tire wheel misalignment shown in FIG. 5(b) is a useful situation in which to introduce and describe the present invention.

Within manufacturing tolerances, all of the mount studs 12, 13, 14, 15 and 16 shown in FIG. 3(a) extend outwards an equal distance from vehicle mounting surface 11. FIG. 5(b) shows this for the mount studs which appear in its view. This outward reach of said mount studs is here called longitudinal outreach.

The present invention consists of a detachable two-part mount stud extension assembly which is screwed onto a vehicle mount stud and thus increases the effective longitudinal outreach of said mount stud. The resultant detachable two-part-mount-stud-extension-assembly/vehicle-mount-stud assembly according to the present invention is here called an initial-align/mount stud. The tire wheel is initially aligned with and mounted onto said initial-align/mount stud. Embodiments of the present invention differ in the number of initial-align/mount studs.

Figure 6:
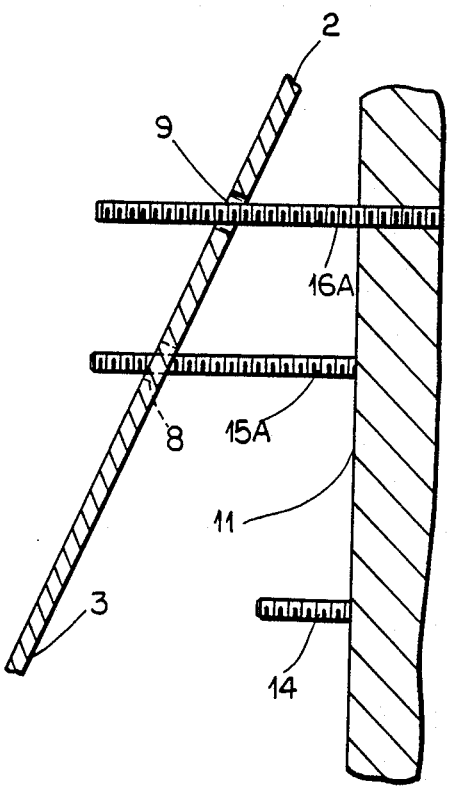

FIG. 6 shows a schematic representation of Example #1 of the present invention which has two initial-align mount studs, 15A and 16A. Initial-align/mount studs 15A and 16A result from vehicle mount studs 15 and 16 each having a detachable two-part mount stud extension assembly screwed onto them. In order to more clearly focus the discussion of the role and utility of the increased effective longitudinal outreach of the initial-align/mount studs, in FIG. 6 the effective longitudinal outreach of 15A and 16A are schematically/geometrically represented without showing the form, outlines and details of the detachable two-part mount stud extension assembly and its assembly onto the vehicle mount stud.

In its assembled state screwed onto vehicle mount stud 16 in accordance with the present invention, FIG. 9 shows said detachable two-part mount stud extension assembly which is comprised of an adapter 28 and an extender 35. FIG. 9 therefore is a more detailed depiction of initial-align/mount stud 16A which is shown in FIG. 6.

Figure 7A:
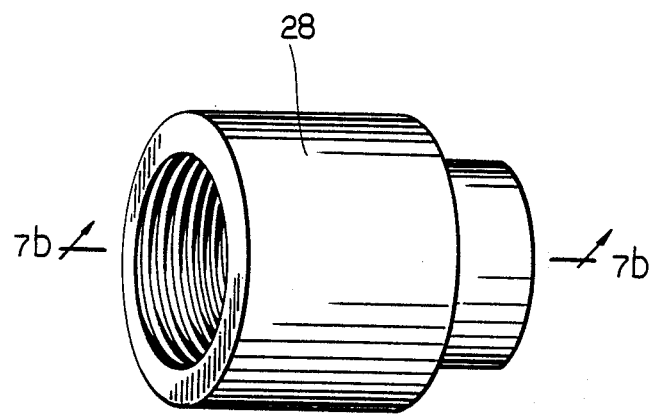
FIG. 7(a) is a perspective view of the adapter in Example # 1 of the present invention.
Figure 7B:
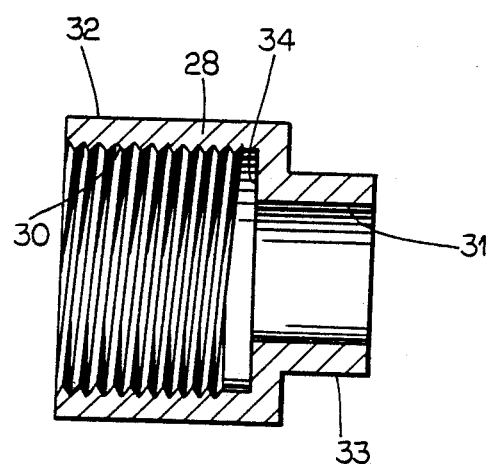
FIG. 7(b) is a sectional view of said adapter along line 7b—7b of FIG. 7(a).

Adapter 28 is shown in a perspective view in FIG. 7(a). The details of this hollow, basically cylindrical body are better seen in the sectional view shown in FIG. 7(b). One longitudinal end section of adapter 28 has an internal thread 30; the second longitudinal end section has an extender alignment hole 31. Diameters 32 and 33 are here shown to be different, but they need not be; both need to be cleared by tire wheel clearance holes 5, 6, 7, 8 and 9; increasing diameter 33 to where it exceeds diameter 32 serves no good purpose, but rather challenges its ability to be cleared by said tire wheel clearance holes.

As shown in the perspective view of FIG. 8(a), the extender 35 is a headed shaft. The head 36 is a disk-like end at one end of the shaft section of the extender. As also seen in the elevational and end views of FIGS. 8(b) and 8(c) respectively, the disk diameter 37 is greater than diameter 38 of the shaft section.

The two-step assembly of the detachable two-part mount stud extension assembly in accordance with the present invention will be described with reference to FIGS. 7, 8 and 9. First step: the unheaded shaft end 27 of extender 35 is passed through the threaded end of adapter 28, on into the extender alignment hole 31. Second step: the threaded end of adapter 28 is screwed onto a mating vehicle mount stud, here typified by mount stud 16; extender 35 is now captured within the resulting initial-align/mount stud 16A. Said capture of extender 35 is as follows: in one axial direction, longitudinal end face 40 of extender 35 bears against and is captured by end face 22 of mount stud 16; in the opposite axial direction, the annular vertical face 39 of extender 35 bears against and is captured by structural section 34 of adapter 28.

The initial mounting of the tire wheel is on extender 35, so that a safe utilization of the present invention requires a safe, secure completion of said capture of extender 35, which means that said screwing of adapter 28 onto its mating vehicle mount stud must proceed through to the safe and secure point where a safe number of threads 30 have been threaded onto said mount stud, where here said safe and secure point is named and referred to as safe screwing completion. In the actual operational environment in which the present invention is used, there can occasionally be dirt, rust or metal shaving material located in the mechanical interface between adapter internal thread 30 and the external threads of the mating vehicle mount stud. Lay public users of the present invention can be mislead by said dirt/rust/metal-shaving material in said thread interface blocking/stopping any continued adapter screwing onto said mount stud into thinking that said safe screwing completion has happened. The present invention provides a means of avoiding said safety hazard as follows.

In said second step of said two-step assembly of the detachable two-part mount stud extension assembly, when continued screwing of adapter 28 onto its mating vehicle mount stud is no longer possible due to screwing resistance, extender 35 is checked for axial end play or freedom. When safe screwing completion has been achieved, extender longitudinal end face 40 bears against end face 22 of mount stud 16, so that no end or axial play of said extender 35 along extender alignment hole 31 is possible. Therefore, the user of the present invention checks at the point of apparent achievement of safe screwing completion: if extender 35 has no said end play, then safe screwing has been completed; if extender 35 has some said end play, then said user must check to see whether more screwing is indeed possible, or, whether dirt, rust or metal shaving material is interfering with the required completion of said safe screwing completion.

The tire wheel align-and-mount process according to the present invention is comprised of two phases. The first phase has as its objective the mounting of the tire wheel onto the two initial-align/mount studs. The second phase has as its objective the completion of the tire wheel align-mount-secure process through removal of said two detachable two-part mount stud extension assemblies and the subsequent securing of the lug nuts.

As shown in FIG. 6, tire wheel 2 is aligned with and initially mounted onto the two initial-align/mount studs 15A and 16A, thus reducing the number of mount studs which are essentially simultaneously mounted onto from five as normally done to two in the present invention. As a consequence of this mounting onto two rather than onto five mount studs, the required manual effort and difficulty in achieving tire wheel alignment and mounting are drastically reduced. This is better understood by a further examination of and comparison between FIG. 5(b) and FIG. 6.

Recall that FIG. 6 differs from FIG. 5(b) only in that FIG. 6 shows the effective geometry of screwing said detachable mount stud extension assemblies onto mount studs 15 and 16, resulting in initial-align/mount studs 15A and 16A respectively; however, FIGS. 5(b) and 6 represent exactly the same situational view and geometric repeats of the relative positions of tire wheel 2 and vehicle tire wheel mounting surface 11. The tire wheel initial-align/mount process shown in FIG. 5(b) is still-unconsummated, as yet unsuccessful, where that shown in FIG. 6 is consummated and successful. FIG. 6 shows the extended-length initial-align/mount studs 15A and 16A cleared and enveloped by their respective clearance holes 8 and 9. Further, at this point, the weight of tire wheel 2 is supported and its initial alignment preserved by initial-align/mount studs 15A and 16A. This then is a graphic illustration of the fact that the envelope of spatial tire wheel positionings which result in a successful initial alignment and mounting is greatly expanded by the present invention.

The point in the mounting process shown in FIG. 6 is early in the second of the two tire wheel mounting phases. In this concluding mounting phase, tire wheel 2 is pushed and moved along and on initial-align/mount studs 15A and 16A towards vehicle mounting surface 11 through to where the remaining mount studs 12, 13, and 14 are also cleared by their mating clearance holes 5, 6, and 7, then continuing through to the final mounting positions against vehicle mounting surface 11.

Both separately in each phase and in cumulative total, the manual effort and difficulty inherent and required in the aligning and mounting of a tire wheel onto a wheeled vehicle are drastically reduced by the present invention. Extensive, actual physical trials using the present invention showed that this facilitation in tire wheel alignment/mounting is much greater than the considerable, major amount which would be a priori expected or predicted upon analysis. Nevertheless, the present invention is better understood by examining those of its advantages which are identifiable via a priori analysis.

Maintaining simultaneous visual contact with all of the clearance holes in the tire wheel greatly helps in the align-and-mount process. However, acheiving and maintaining this visual contact is a problem even if a vehicle lift is being used so that the target view is elevated several feet above the ground. This visual contact is even more difficult in the more common situation where the vehicle is being lifted with an apparatus such as a bumper jack where the target view is much closer to ground level. Therefore, the fact that the present invention requires visual access to only two of said clearance holes in the FIG. 6 embodiment, or to only one clearance hole in other embodiments, is an additional contributing factor whereby the present invention reduces the manual effort and difficulty required in the tire wheel align and mount process.

In FIG. 3(a) the mount studs are shown to be located on circular centerline 19. As shown in FIG. 6, the two initial-align/mount studs 15A and 16A are shown to be adjacent to each other on said centerline 19. However, the present invention does not require that the initial-align/mount studs be adjacent to each other in embodiments with more than one initial-align/mount stud. All of the objectives of the present invention are also achieved if the two initial-align/mount studs are not adjacent to each other on said mount studs centerline. However, operational tests conducted according to the present invention with different tire wheel sizes and weights, people of both sexes and different sizes and strengths, various operating and ambient conditions of lighting, did reveal a preference for the adjacent over the non-adjacent initial-align/mount stud embodiment even though both embodiments had excellent performance results and the achievement of all of the objects of the present invention.

The presently preferred embodiment of the present invention has a minimum longitudinal outreach differential between the initial-align/mount stud and the rest of the vehicle mount studs of between four to five inches. This four to five inch minimum was arrived at via the earlier-referred to operational testing program of the present invention where the experiments/testing included wide and comprehensive parametric ranges and types not only of the detachable mount stud extension assembly, but also of people, strengths, sexes, tire wheels and lighting ambients. Most of the full-scale testing was with longitudinal outreach differentials over a range of from two to seven inches; the present invention had excellent performance both over the whole of this range, and outside of this range. However, the preference of the test participants was for a minimum longitudinal outreach of four inches.

A further advantage of said mimimum outreach differential is that a surprisingly useful margin results of added-distance-normal-to-the-vehicle-body at which the person mounting the tire wheel can bend or crouch in the common situation where the vehicle is lifted by a bumper jack or other means with a similar vehicle lift-and-suspend range in the class of a few inches.

Due to the required know-how and effort, relatively few vehicle drivers and owners know the thread size and type of the tire wheel mounting studs and lug nuts on their vehicle. This poses a basic, practical problem and obstacle both in any initial purchase of, and, to the subsequent use of any tire wheel alignment/mount apparatus which must be screwed onto said tire wheel mount studs. The detachable two-part mount stud extenders according to the present invention can be sold as a general-purpose set in a package which lists a comprehensive range of the wheeled vehicle manufacturers/models/model-years which are fit/accommodated by said extension set. Said general-application set can enable two initial-align/mount studs for each of the vehicle mount stud threads to be fit/accommodated where each said set consists of: a plurality of pairs of adapter, one adapter pair each for each of the vehicle mount stud threads to be fit/accommodated, plus a single pair of extenders, where said extenders are universal in that they fit all of the different adapters according to the present invention. In use, from the package set of adapter pairs where each adapter pair has a different thread size/type, the user of the present invention selects the particular, mating adapter pair required. If required, said adapter pairs can be selected by easy trial-and-error.

EXAMPLE #2

This embodiment is tailored to the application wherein the contents of a single package are to fit a single vehicle tire wheel mount stud and lug nut size and type. As depicted in FIG. 10, an elongated adapter 28A captures extender 35A: said capture is achieved with the same assembly process and capture mechanics for all of the embodiments of the present invention, so that said assembly/capture description given for the previously presented embodiment need not be repeated here.

Tire wheel 2 is initially aligned with and mounted onto adapter 28A, this in contrast to the previously presented embodiment where said initial-align/mount function is served by the extender. Following its initial alignment and mounting on adapter 28A, tire wheel 2 is pushed and moved along and on initial-align/mount studs 15A and 16A towards vehicle mounting surface 11 through to where the remaining mount studs 12, 13, and 14 are also cleared by their mating clearance holes 5, 6, and 7, then continuing through to the final mounting positions against vehicle mounting surface 11, after which said two detachable two-part mount stud extension assemblies are removed from their mating mount studs prior to the final installation of all of the lug nuts, all of this also true for all of the embodiments of the present invention.

The logic, mechanics and process of checking that safe screwing completion has been achieved is exactly the same in all embodiments of the present invention. Therefore, the description given of the check for safe screwing completion given earlier for the previously presented embodiment need not be repeated here. Said safe screwing completion check is the sole function of extender 35A: tire wheel 2 is not mounted onto said extender, in contrast to the previously presented embodiment. Extender 35A protrudes outwards approximately three-quarters of an inch beyond adapter 28A at its outer extender alignment hole when safe screwing completion has been achieved; this is a design option dimension, said extender protrusion just enough to enable said extender end play check for the achievement of safe screwing completion.

EXAMPLE #3

Another specific embodiment of the present invention is depicted in FIG. 11, being comprised of adapter 28A and extender 35B. The FIG. 11 embodiment differs from that of FIG. 10 only in the extender, and is depicted in an illustrative/typical cooperative configuration with extender-extension 35C. In the FIG. 11 embodiment, extender 35B does not protrude outwards beyond adapter end face 41 of said adapter 28A. The detachable two-part mount stud extension assembly consists of adapter 28A and extender 35B, and is assembled and mounted onto its mating mount stud in the same way as is done in the embodiment of FIG. 10 up to the point where the extender axial end play test/check for the achievement of safe screwing completion is to be conducted, whereafter the following ensues.

Extender longitudinal extension 35C is screwed onto and joined with extender 35B at the screwing junction comprised of external threads 42 of extender longitudinal extension 35C and internal threads 43 of extender 35B; any difficulty in said screwing due to joint rotation of said extender 35B and extender longitudinal extension 35C is an additional/preliminary signal that safe screwing completion has not been achieved. The joining of extender 35B and extender longitudinal extension 35C results in extender-assembly 35D. The extender axial end play test/check for the achievement of safe screwing completion is performed exactly as in the embodiment depicted in FIG. 10 with extender-assembly 35D performing exactly as does extender 35A. The outline geometries of extender-assembly 35D and extender 35A are the same. Based upon the most recent operational testing, a single rather than a several initial-align/mount embodiment was chosen, though both embodiment options performed very satisfactorily meeting all objectives of the present invention. When safe screwing completion is achieved, extender longitudinal extension 35C is then unscrewed/removed from extender 35B and said two-part mount stud extension assembly is now ready for its tire wheel align and mount role and function. The fact that said extender 35B does not protrude outwards beyond said adapter end face 41 of adapter 28A eliminates the danger/possibility that the tire wheel can touch the extender and cause damage to the elements involved, or interfere with said tire wheel align and mount process. While this tire wheel-extender interference/touch/damage problem did not emerge/happen during the extensive operational testing of the present invention, it is a conceptually possible happening.

EXAMPLE #4

Another embodiment of the present invention is depicted in FIGS. 12A, 12B and 13, which are collectively referenced in this discussion. In this embodiment, the initial-align/mount stud is comprised of an adapter 28A mounted onto mount stud 16, as depicted in FIG. 13. Adapter 28A in this embodiment is the same as that in Example #2 and in Example #3. Extender 35E, shown in an elevational view in FIG. 12A and in an end view in FIG. 12B is a shaft with a circumferential marking band 44.

Tire wheel 2 is initially aligned with and mounted onto the initial-align/mount stud in the first phase of the two-phase tire wheel align-and-mount process. Accordingly, a safe utilization of the present invention here also requires the safe screwing completion of adapter 28A onto mount stud 16. When safe screwing completion of adapter 28A onto mount stud 16 has apparently been achieved, the following check is made to confirm said safe screwing completion.

The end-face-40 end of extender 35E is inserted into and pushed along extender alignment hole 31 of adapter 28A until continued extender advance is stopped by the bearing of extender end face 40 against end face 22 of mount stud 16. Safe screwing completion of adapter 28A onto mount stud 16 is achieved when marking band 44 of extender 35E extends outwards to and beyond end face 41 of adapter 28A and is consequently visible.

Said check for safe screwing completion rests upon the following. The axial distance along the longitudinal axis of extender 35E between extender end face 40 and the axial point at which marking band 44 is located is here named and referred to as the extender calibrated probe distance. The axial distance along the longitudinal axis of adapter 28A along extender alignment hole 31 from the point at which end face 22 of mount stud 16 is located as a result of the screwing progression of adapter 28A onto mount stud 16, to the location of adapter end face 41 is here named and referred to as adapter longitudinal extension outreach. Said adapter longitudinal extension outreach is a variable, being reduced by the amount of linear screwing advance of adapter 28A along mount stud 16. Marking band 44 is located on extender 35E at a calibrated point so that when said extender calibrated probe distance is approximately equal to or greater than said adapter longitudinal extension outreach, marking band 44 is visible, and, a sufficient, safe number of adapter internal threads 30 have engaged the external threads of mount stud 16 so that safe screwing completion of adapter 28A onto mount stud 16 has been achieved. After the achievement of said safe screwing completion, extender 35E is removed and the tire wheel align-and-mount process is performed.

Other indicating means on the extender can be employed to signal that said extender calibrated probe distance is approximately equal to or greater than said adapter longitudinal extension outreach and consequent achievement of said safe screwing completion. Examples of alternatives are: notched circumferential ring around the circumference of extender 35E; or, a reduction from diameter 38 to a smaller extender shaft diameter in the region between marking band 44 and extender shaft end 27.

The embodiments described have circular cross-sections in the following: said extender alignment hole in said adapter; said extender headed end; said extender shaft section: said cross-sections could have geometries other than circular.

Thus it is seen that these embodiments achieve all of the objectives of the present invention: greatly reduce the manual effort and difficulty required to align and mount a tire wheel in conditions of good and poor lighting; in good and poor lighting, provide the general lay public user a positive means for checking that safe screwing completion has been achieved; apparatus to be small and light, easily stored and available, very reliable, and well, inherently suited for low-cost high-volume manufacturing.

Having described the presently preferred embodiments and details of the present invention, it will be understood that there are still other embodiments and details of construction which may be introduced without departing from the true spirit and scope of the present invention as defined in the appended claims.

I claim:

1. For aligning and mounting a tire wheel onto a wheeled vehicle wherein subsequent securing of said tire wheel onto said vehicle is accomplished with vehicle tire wheel mount studs and mating lug nuts, an apparatus, comprising:
    (a) an adapter, a first part of a detachable two-part mount stud extension assembly which is hollow along its longitudinal axis, wherein at one end of and centered around the longitudinal axis of said adapter is an extender alignment hole with an internal hole end which opens into the internal cavity of said adapter, wherein the surrounding face of said internal hole end is formed by an annular face region of the structure of said adapter, and the outer end of said extender alignment hole opens into the outermost face of said adapter at that adapter longitudinal end, wherein at the other end of and centered around the longitudinal axis of said adapter is an internal thread which fits that of a mating vehicle tire wheel mount stud; and,
    (b) an extender, the second part of said detachable two-part mount stud extension assembly, wherein said extender consists of a shaft; and,
    (c) wherein one step in the assembly of said detachable two-part mount stud extension assembly is the mounting of said adapter onto a mating vehicle tire wheel mount stud by screwing said internal thread of said adapter onto the external thread of a mating vehicle tire wheel mount stud, wherein another step in said assembly of said detachable two-part mount stud extension assembly is the insertion of one end of said extender into said outer end of said extender alignment hole of said adapter, said insertion continuing through as far as continued insertion travel freedom permits, wherein said detachable two-part mount stud extension assembly at both its outermost extender end and its outermost adapter end extends outwards in the direction away from the vehicle further than do the rest of the vehicle tire wheel mount studs which are not mated with said detachable two-part mount stud extension assembly.

2. An apparatus as recited in claim 1, wherein the cross-sections of the following are circular: said extender alignment hole of said adapter; said extender.

3. An apparatus as recited in claim 1, wherein said adapter extends outwards in the direction away from the vehicle from about two inches to about seven inches further than do the rest of the vehicle tire wheel mount studs which are not mated with said detachable two-part mount stud extension assembly.

4. An apparatus as recited in claim 1, wherein said extender contains means which demarcate one longitudinal section of said extender from the rest of said extender.

5. An apparatus as recited in claim 4 wherein said means are tactile.

6. An apparatus as recited in claim 4 wherein said means are visual.

* * * * *